United States Patent [19]

Bloch

[11] Patent Number: 4,900,078
[45] Date of Patent: Feb. 13, 1990

[54] GRIPPING DEVICE UTILIZING A SHAPE MEMORY ALLOY

[75] Inventor: Joseph T. Bloch, Seattle, Wash.

[73] Assignee: The Boeing Company, Seattle, Wash.

[21] Appl. No.: 946,480

[22] Filed: Dec. 23, 1986

[51] Int. Cl.⁴ ............................ B66C 1/10; B25J 15/00
[52] U.S. Cl. .................................. 294/86.4; 294/119.1; 901/36
[58] Field of Search ................ 294/86.4, 88, 92, 98.1, 294/119.1, 87.1, 907; 901/30, 33, 39; 414/730, 735, 739; 29/830; 411/909; 310/307; 439/14

[56] References Cited

U.S. PATENT DOCUMENTS

| | | | |
|---|---|---|---|
| 3,976,206 | 8/1976 | Flatau | 294/86.4 |
| 4,002,954 | 1/1977 | Orlando | 310/307 |
| 4,530,536 | 7/1985 | Williams | 294/86.4 |
| 4,627,654 | 12/1986 | Van Oost | 294/86.4 |
| 4,715,637 | 12/1987 | Hosada et al. | 294/86.4 |

Primary Examiner—Johnny D. Cherry
Assistant Examiner—Gary C. Hoge
Attorney, Agent, or Firm—Foley & Lardner, Schwartz, Jeffery, Schwaab, Mack, Blumenthal & Evans

[57] ABSTRACT

A gripping device for gripping or grasping an object within a set of jaws utilizing a shape memory alloy material that is both simple of construction and suitable for use in space as well as on Earth. The shape memory alloy contracts when heated and operates to move the jaw bears in a given direction. When no heat is applied to the shape memory alloy, a returning mechanism moves the jaw bars in the opposite direction. The shape memory alloy material may be in the form of a strap or wire which is easily heated and provides for a fast closing and opening action of the jaws of the gripping device.

29 Claims, 2 Drawing Sheets

GRIPPING DEVICE UTILIZING A SHAPE MEMORY ALLOY

BACKGROUND OF THE INVENTION

The present invention is directed toward a gripping device which utilizes a shape memory alloy as an operative component thereof.

Various types of connectors have been utilized which employ a heat recoverable metallic band made, for example, of Nitinol. Nitinol is an electrically conductive alloy containing large proportions of nickel and titanium. A Nitinol wire, for example, may be stretched up to about 10% of its length and will remain in the stretched state even when the tensile stress used to stretch the wire is removed. If the temperature of the wire is then elevated above its martensitic critical temperature, the wire will return to its original unstretched state as if it had a "memory" of its unstretched length. When the wire contracts to its original length it exerts a contracting force which has been used in various applications. U.S. Pat. No. 4,002,954 discloses the utilization of a Nitinol wire for activating a photographic shutter and sets forth a particular electronic circuit arrangement to provide a current pulse sufficient to heat the Nitinol wire to its critical temperature. U.S. Pat. Nos. 3,740,839 and No. 4,497,527 disclose connecting devices utilizing a socket member with several tines and a band positioned over the tines for biasing them toward their center in a contracted state of the band. The band is made of a heat recoverable metallic material. Additional teachings of heat shrinkage and heat recoverable material may be found in U.S. Pat. Nos. 3,445,898, No. 3,622,941 and No. 4,556,050.

Grippers to date have mostly used either pneumatic or hydraulic actuators to achieve the gripping function. These actuators work fine, but require a fluid such as air or oil. This fluid requirement makes these types of actuators difficult to adapt for use in space applications. Additionally, pneumatic and hydraulic grippers are relatively expensive.

One alternative to the hydraulic/pneumatic gripper, for use in space, are electro-mechanical grippers. These are of basically two types, those that use motors and those that use heat activated bimetallic members to effect closing of the gripper, such as are disclosed in British published application No. 862,174. Both of these methods tend to produce bulky, heavy and cumbersome grippers.

A third alternative is disclosed in U.S. Pat. No. 4,509,517 to Zibelin which discloses a device that closes its jaws upon the shortening of a Nitinol wire. This reference, however, fails to provide a versatile clamping device that can be used for relatively large jaw movements in consideration of the relatively small 8-10% length shrinkage of the Nitinol wire. Further, in the prior art, Zibelin teaching does not provide any mechanism for rapidly and uniformly heating the Nitinol wire. The above-enumerated patents are hereby incorporated by reference.

SUMMARY OF THE INVENTION

It is therefore an object of the present invention to provide a simple, lightweight, compact and easily fabricated gripping device which utilizes a shape memory alloy as an operative part thereof.

It is a further object of the invention to provide a relatively inexpensive gripping device which utilizes a shape memory alloy, which is suitable for use in space applications.

Yet another object of the invention is to provide a gripping device utilizing a shape memory alloy in which electrical current may be passed through the shape memory alloy to thereby heat same and cause the alloy to contract, thereby actuating the gripping mechanism.

The invention is directed to a gripping device which comprises a plurality of jaw bars; at least one electrical terminal; a first shape memory alloy wire having a characteristic of contracting when heated, said shape memory alloy wire being attached at one end to said electrical terminal, and is attached at the second end to a movement transmitting means; said movement transmitting means for transmitting the contracting movement of said first shape memory alloy wire to said jaw bars so as to bias said jaw bars toward one another when said shape memory alloy wire is heated; and a returning means for biasing said jaw bars away from one another.

BRIEF DESCRIPTION OF THE DRAWINGS

Other objects and advantages of the present invention will become apparent in view of the detailed description set forth below taken in conjunction with the drawings, wherein.

DETAILED DESCRIPTION OF THE PREFERRED EMBODIMENTS

Figure 1:
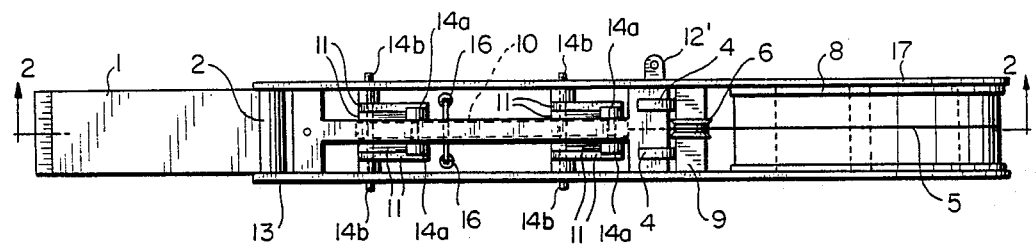
FIG. 1 is a top view of the gripping device in accordance with the invention.
Figure 2:
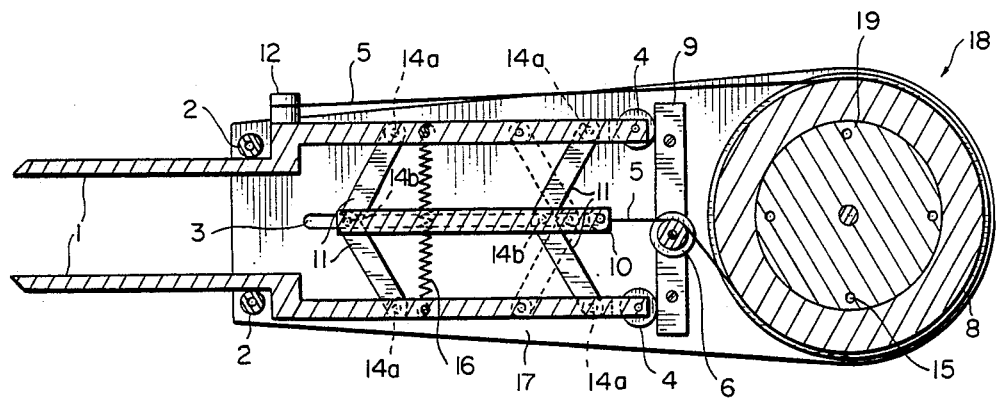
FIG. 2 is a cross-sectional view of the gripping device in an open position thereof taken along line 2—2 of FIG. 1.
Figure 3:
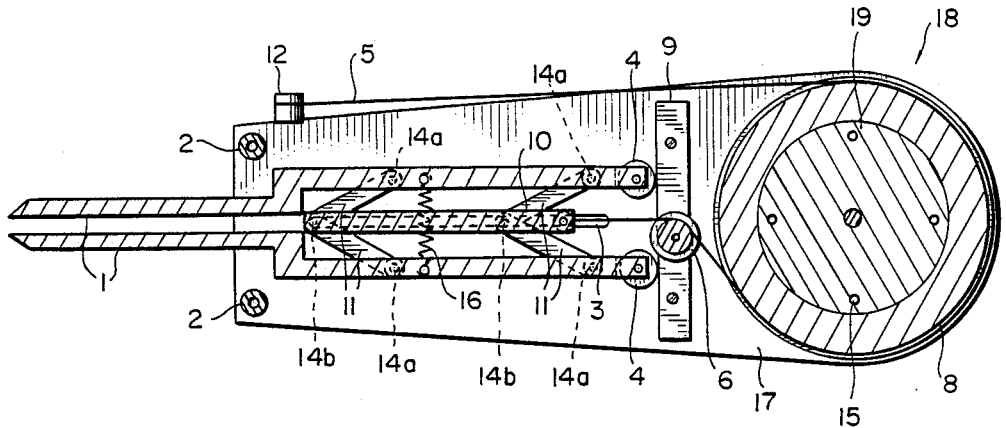
FIG. 3 is a cross-sectional view of the gripping device in a closed position thereof taken along line A—A of FIG. 1.

A first embodiment of the invention is illustrated in FIGS. 1, 2 and 3. As may be seen therein, a clamping device 18 includes a front cover plate 17 and a back cover plate 13. Fixed between cover plates 13 and 17 are spacers 2, load bar 9, pulleys 6, 8 and electrical terminal 12. Between cover plates 13, 17, jaw bars 1 are supplied with wheels 4 rotatably attached to one end thereof, which are movably engaged with load bar 9. Jaw bars 1 are further supplied with pins 14a, which connect jaw bars 1 to one end of link bars 11 in such a way as to allow link bars 11 to rotate around pins 14a. Link bars 11 are fastened at their other end to actuator bar 10 by additional pins 14b in a similar fashion. A spring 16 biases the two jaw bars 1 toward each other. The pins 14b that are connected to actuator bar 10 also protrude through two guide slots 3, one cut into each cover plate 13 and 17. Finally, shape memory alloy wire 5 is routed from electrical terminal 12 around pulleys 8 and 6 to actuator bar 10.

An electric current is caused to pass through the Nitinol wire thus causing it to be heated. Terminal 12 provides one voltage source connection and the ground return to the voltage source is supplied at any point on the gripper cover plates 13 and 17 as shown, for example, at 12'. Electrical connection to the cover plates 13 and 17 is established through the contact of one or more of the four pins 14b with the edges of the slot 3 cut into the cover plates. It has been found that good electrical contact may be established even when the pins 14b are sliding within the slot 10. A voltage source (not shown) may be simply connected via suitable switch means to connect to terminals 12 and 12'. For this purpose voltage pulse producing circuit such as illustrated in the above-referenced U.S. Pat. No. 4,002,954 may also be utilized. It is to be noted that the pulleys 8 and 6 are insulators and may be fabricated from nylon or other suitable material.

The operation of the gripper is based on the fact that shape memory alloys, of which Nitinol is one, can remember their shape. After being deformed, a shape memory alloy wire will return to its original shape and size when heated. When no electrical current is being supplied to terminal 12, springs 16 bias jaw bars 1 toward each other, closing the jaws and stretching shape memory alloy wire 5 (as shown in FIG. 3). The current causes the shape memory alloy wire 5 to heat up according to the following formula:

$$P = I \times R$$

where I is the total electric current, R is the total resistance of the shape memory alloy wire 5 and P is the total heat generated. This heat causes the shape memory alloy wire 5 to contract back to its original length. The force exerted by the contracting wire 5 is transferred by pulleys 6 and 8. This transferred force causes actuator bar 10 to move, guided by guide slots 3, toward load bar 9. This movement pivots links 11 around pins 14a, which biases jaw bars 1 apart, counteracting the pull of springs 16.

Springs 16 could also be employed to bias jaw bars 1 away from one another instead of toward one another. In this embodiment, springs 16 would have to be longer than in the previously discussed embodiment. Links 11 would be attached to actuator bar 10 by pins 14 so as to be pointing toward pulley 8 and load bar 9 rather than toward spacers 2, as shown in dashed lines in FIG. 2.

In this embodiment, springs 16 would bias jaw bars 1 away from one another, and would also stretch the shape memory alloy wire 5. When a current is supplied to terminal 12, wire 5 would contract, biasing jaw bars 1 toward each other and compressing springs 16.

FIGS. 1, 2 and 3 also show pulley 8, which is much larger than pulley 6, supplied with a stationary center disk 19. Mounting holes 15 are provided which are aligned with similar holes (not shown) in the front cover plate 17. These holes can be utilized to mount the gripper device to a stationary or mobile stand, i.e., a robot arm, or the like. The larger pulley 8 serves as an accumulation means for retaining or accumulating a relatively large length of Nitinol wire. While the absolute length of the Nitinol wire may be on the order of 8-20 inches, the amount of wire is "relatively large" in the sense that the wire path is intentionally made larger than necessary given the physical size of the device, e.g., pulley 8 could be used to loop the wire for connection to actuator bar 10. The use of the accumulation means in the form of a larger pulley increases the length of the Nitinol wire so as to have a greater dimensional movement of the jaw bars 1. The size of the pulley 8 or the overall length of the path dictated by the accumulation means may be selected to achieve the desired length of movement of the jaw bars 1 considering the constraint that the Nitinol wire contracts to about 8–10% of its total length. Thus, the larger the path length dictated by the accumulation means, the larger amount of "shrinkage" of the Nitinol wire (in absolute terms) and the greater the movement of the jaw bars 1.

Figure 4:
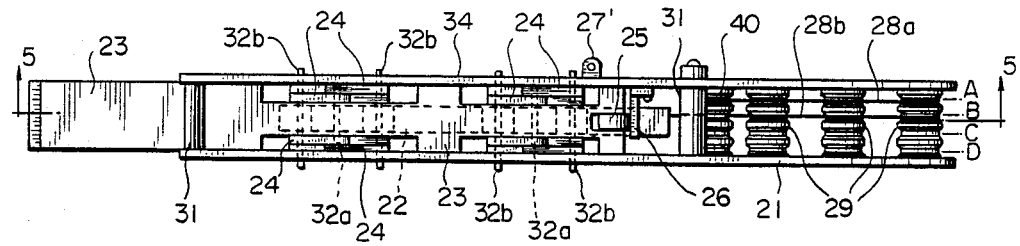
FIG. 4 is a top view of a second embodiment of the invention.
Figure 5:
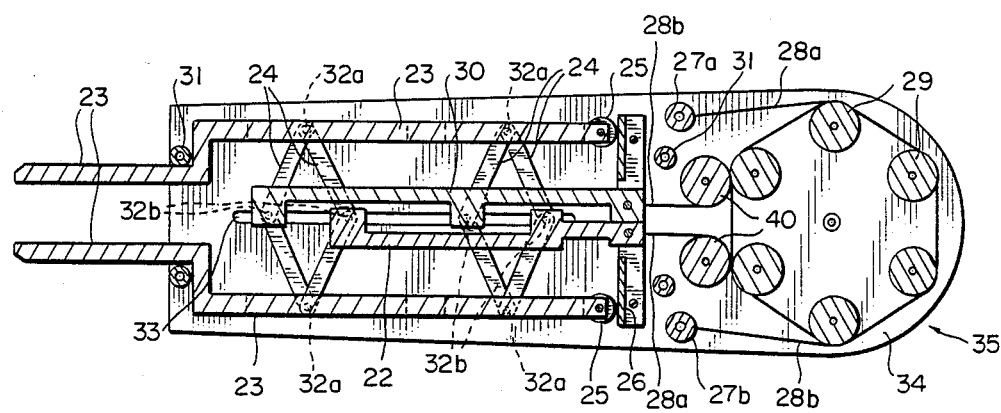
FIG. 5 is a cross-sectional view of the second embodiment of FIG. 4 in an open position thereof taken along line 5—5 of FIG. 4.
Figure 6:
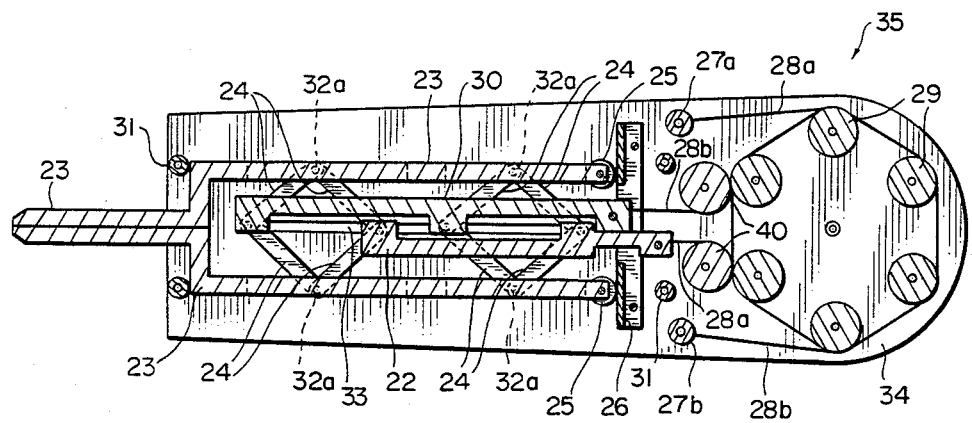
FIG. 6 is a cross-sectional view of the second embodiment of FIG. 4 in a closed position thereof taken along line B—B of FIG. 4.

A third embodiment of the invention is illustrated in FIGS. 4, 5 and 6. As may be seen therein, a clamping device 35 includes a front cover plate 34 and a back cover plate 21. Fixed between cover plates 21 and 34 are spacers 31, load bar 26, pulleys 29, and electrical terminals 27a and 27b. Also between cover plates 21 and 34 are jaw bars 23 which are supplied with rollers 25, rotatably attached to one end thereof, which are movably engaged with load bar 26. Jaw bars 23 are further supplied with pins 32a, which connect jaw bars 23 to one end of link bars 24 in such a way as to allow link bars 24 to rotate around pins 32a. Link bars 24 are fastened in a similar fashion at their other end to one of the actuator bars 22 or 30 via pins 32b. Each jaw bar 23 is connected to each actuator bar 22 and 30 via the link bars 24. The pins 32b which are connected to actuator bars 22 and 30 also protrude through two guide slots 33, one cut into each cover plate 21 and 34. Shape memory alloy wires 28a and 28b are routed from electrical terminals 27a, 27b around pulleys 29 and feed pulleys 40 to actuator bars 22 or 30. A terminal 27' (FIG. 4) is utilized for a ground return terminal of the electric circuit with pins 32b making electrical contact with the cover plates 34 and 21.

As an example, the pulleys 29 and 40 which lie in plane A (see FIG. 4) are used to provide an accumulation means for the wire 28a whereas the pulleys 29 and 40 in plane B provide an accumulation means for wire 28b. Wire 28a is thus fastened to terminal 27a, passes over the pulleys 29 and 40 in plane A and connects to the actuator bar 22. Wire 28b is fastened to terminal 27b and wraps around the pulleys 29 and 40 of plane B and connects to the actuator bar 30. It is noted that the cross-sectional view shown in FIG. 5 illustrate the pulleys 29 and 40 of plane B. Clearly, the wires 28a, b may also pass around the pulleys 29 and 40 of more than one plane to gain a greater accumulation effect to thus increase the total length change of the wires. It is desirable, however, for the embodiment of FIGS. 4–6, that the wires 28a and 28b pass over the same number of pulleys so as to have the same length.

This embodiment utilizes shape memory alloy wire to both bias open and bias closed jaw bars 23. When current I is supplied through shape memory alloy wire 28a which is connected to actuator bar 22, the contraction of wire 28a due to the heat generated by passing over pulleys 29 and 40 of plane A. Actuator bar 22 is pulled along slot 33 by wire 28a away from the jaw end of the gripper, i.e., to the right in FIGS. 5 and 6. This movement of actuator bar 22 is transmitted to the jaw bars 23 and the other actuator bar 30. Actuator bar 30 is guided along slot 33 toward the jaw end of the gripper, to the left in FIGS. 5 and 6, stretching shape memory alloy wire 28b which is connected to it, and thus, the jaw bars 23 are biased away from one another. As a result of the above movement of the actuator bars 22 and 30, the gripper's jaws are closed (as shown in FIG. 6).

When current I is applied only to the shape memory alloy wire 28b, which is connected to actuator 30, the resulting contraction of the wire (stretched during the above jaw closing operation) causes actuator bar 30 to move along slot 33 away from the jaw end of the gripper, i.e., to the right in FIGS. 5 and 6. This movement is transmitted via links 24 to jaw bars 23 and the other actuator bar 22. Actuator bar 22 is guided along slot 33 toward the jaw end of the gripper, stretching the shape memory alloy wire 28a which is attached to it, and thus, the jaw bars 23 are biased toward one another. As a result of this movement of actuator bars 22 and 30, the gripper's jaws are again opened (as shown in FIG. 5).

In both embodiments, the arrangement of the pulleys 6 and 8 in FIG. 2 and pulleys 29 and 40 in FIG. 5 and the routing of the shape memory alloy wires are determined by the size of the gripper and the jaw stroke that is desired.

The gripping force available is a function of the thickness of the shape metal alloy. Increase of the wire thickness to achieve a stronger gripping force also requires a larger current to achieve the same heating rate for the smaller diameter wire.

It is also possible to heat the shape metal alloy by means other than passing an electric current therethrough as, for example, by radiant heat or other means.

Although the invention has been described with reference to the preferred embodiments thereof, it is evident to those of skill in the art that various modifications and improvement may be made without departing from the spirit and scope of the invention as defined by the appended claims.

What is claimed is:

1. A gripping device comprising:
   (a) a plurality of jaw bars;
   (b) a first and second electrical terminal;
   (c) a first shape memory alloy wire having a characteristic of contracting when heated, said shape memory alloy wire being attached at a first end thereof to said first electrical terminal, a second end of said wire being electrically connected to a second terminal;
   (d) movement transmitting means, separate and distinct from said first shape memory alloy wire, connected to the second end of said wire for transmitting the contracting movement of said first shape memory alloy wire to said jaw bars so as to bias said jaw bars in a given direction being one of (1) toward one another and (2) away from one another when said shape memory alloy wire is heated; and
   (e) means for biasing said jaw bars in a direction opposite to said given direction.

2. A gripping device as recited in claim 1 wherein said movement transmitting means includes accumulation means for accumulating a given length of said first shape memory alloy wire and through which said first shape memory alloy wire is routed.

3. A gripping device as recited in claim 1 wherein said movement transmitting means comprises:
   an accumulation means for accumulating a given length of said first shape memory alloy wire;
   (b) at least one actuator bar;
   (c) a plurality of link bars;
   (d) at least one cover plate;
   (e) a load bar, fixed to said cover plate and along which an end of each of said jaw bars slides;
   (f) at least one guide slot cut into said cover plate;
   (g) a plurality of pins for rotatably connecting said link bars to said jaw bars and to said actuator bar, and for guiding said actuator bar along said guide slot; and
   (h) wherein said first shape memory alloy wire is routed through said accumulator means and is connected at said second end to said actuator bar.

4. A gripping device as recited in claim 3 further comprising a rolling means rotatably fixed to the end of each of said jaw bars and in contact with said load bar.

5. A gripping device as recited in claim 4 wherein said rolling means comprises a ball bearing.

6. A gripping device as recited in claim 4 wherein said rolling means comprises a wheel.

7. A gripping device as recited in claim 1 wherein said biasing means comprises a spring attached between each of said jaw bars.

8. A gripping device as recited in claim 3 wherein said actuator bars and pins are electrically conductive and said cover plate comprises said second terminal.

9. A gripping device as recited in claim 1 wherein said biasing means comprises a second shape memory alloy wire having a characteristic of contracting when heated, said second shape memory alloy wire attached at a first end thereof to a third electrical terminal and attached at a second end thereof to said movement transmitting means, wherein when said second shape memory alloy wire is heated and contracts, said jaw bars are biased in said opposite direction and said first shape memory alloy wire is stretched.

10. A gripping device as recited in claim 9 wherein said movement transmitting means includes accumulation means for accumulating given lengths of said first and said second shape memory alloy wires and through which said first and said second shape memory alloys are routed.

11. A gripping device as recited in claim 10 wherein said accumulation means comprises groups of a plurality of pulleys, disposed in separate planes.

12. A gripping device as recited in claim 9 wherein said movement transmitting means comprises:
   (a) accumulation means for accumulating a given length of said first and second shape memory allow wires;
   (b) at least two actuator bars;
   (c) a plurality of link bars;
   (d) at least one cover plate;
   (e) a load bar, fixed to said cover plate and along which an end of each of said jaw bars slides;
   (f) at least one guide slot cut into said cover plate;
   (g) a plurality of pins for rotatably connecting said link bars to said jaw bars and to said actuator bars, and for guiding said actuator bars along said guide slot; and
   (h) wherein said first and second shape memory alloy wires are each routed through said accumulator means and are each connected at their respective second ends to a separate actuator bar.

13. A gripping device as recited in claim 2 wherein said accumulation means includes a pulley containing a large stationary center disc.

14. A gripping device as recited in claim 13 wherein mounting holes are provided in said center disc and in said cover plate.

15. A gripping device as recited in claim 3 wherein mounting holes are provided in said cover plate.

16. A gripping device as recited in claim 2 wherein said accumulation means comprises groups of a plurality of pulleys, disposed in separate planes.

17. A gripping device as recited in claim 3 wherein said cover plate is comprised of more than one piece.

18. A method for opening and closing the jaws of a gripping device comprising:

(a) supplying a first electrical current to a first shape memory alloy wire to cause said first shape memory alloy wire to contract;
(b) transmitting movement caused by said contraction to said jaw bars and to a second shape memory alloy wire;
(c) utilizing said transmitted movement to bias said jaw bars away from one another and to stretch said second shape memory alloy wire;
(d) removing said first current from said first shape memory alloy wire;
(e) supplying a second electrical current to said second shape memory alloy wire to cause said second shape memory alloy wire to contract;
(f) transmitting movement caused by said contraction to said jaw bars and said first shape memory alloy wire; and
(g) utilizing said transmitted movement to bias said jaw bars toward one another and to stretch said first shape memory alloy wire.

19. A gripping device comprising:
(a) a housing;
(b) a plurality of jaw bars movably secured to said housing;
(c) a first shape memory alloy wire having a characteristic of contracting when heated, said shape memory alloy wire being attached at a first end thereof to said housing;
(d) movement transmitting means, separate and distinct from said first shape memory alloy wire, connected to a second end of said wire for transmitting the contracting movement of said first shape memory alloy wire to said jaw bars so as to bias said jaw bars in a given direction being one of (1) toward one another and (2) away from one another when said shape memory alloy wire is heated; and
(e) means for biasing said jaw bars in a direction opposite to said given direction.

20. A gripping device as recited in claim 19 wherein said movement transmitting means includes accumulation means for accumulating a given length of said first shape memory alloy wire and through which said first shape memory alloy wire is routed.

21. A gripping device as recited in claim 19 wherein said movement transmitting means comprises:
(a) an accumulation means for accumulating a given length of said first shape memory alloy wire;
(b) at least one actuator bar;
(c) a plurality of link bars;
(d) at least one cover plate forming part of said housing;
(e) a load bar, fixed to said cover plate and along which an end of each of said jaw bars slides;
(f) at least one guide slot cut into said cover plate;
(g) a plurality of pins for rotatably connecting said link bars to said jaw bars and to said actuator bar, and for guiding said actuator bar along said guide slot; and
(h) wherein said first shape memory alloy wire is routed through said accumulator means and is connected at said second end to said actuator bar.

22. A gripping device as recited in claim 21 further comprising a rolling means rotatably fixed to the end of each of said jaw bars and in contact with said load bar.

23. A gripping device as recited in claim 19 wherein said biasing means comprises a spring attached between each of said jaw bars.

24. A gripping device as recited in claim 1 wherein said biasing means comprises a second shape memory alloy wire having a characteristic of contracting when heated, said second shape memory alloy wire attached at a first end thereof to said housing and attached at a second end thereof to said movement transmitting means, wherein when said second shape memory alloy wire is heated and contracts, said jaw bars are biased in said opposite direction and said first shape memory alloy wire is stretched.

25. A gripping device as recited in claim 24 wherein said movement transmitting means includes accumulation means for accumulating given lengths of said first and said second shape memory alloy wires and through which said first and said second shape memory alloys are routed.

26. A gripping device as recited in claim 25 wherein said accumulation means comprises groups of a plurality of pulleys, disposed in separate planes.

27. A gripping device as recited in claim 24 wherein said movement transmitting means comprises:
(a) accumulation means for accumulating a given length of said first and second shape memory allow wires;
(b) at least two actuator bars;
(c) a plurality of link bars;
(d) at least one cover plate forming part of said housing;
(e) a load bar, fixed to said cover plate and along which an end of each of said jaw bars slides;
(f) at least one guide slot cut into said cover plate;
(g) a plurality of pins for rotatably connecting said link bars to said jaw bars and to said actuator bars, and for guiding said actuator bars along said guide slot; and
(h) wherein said first and second shape memory alloy wires are each routed through said accumulator means and are each connected at their respective second ends to a separate actuator bar.

28. A gripping device as recited in claim 20 wherein said accumulation means comprises groups of a plurality of pulleys, disposed in separate planes.

29. A method for opening and closing the jaws of a gripping device comprising:
(a) heating a first shape memory alloy wire to cause said first shape memory alloy wire to contract;
(b) transmitting movement caused by said contraction to said jaw bars and to a second shape memory alloy wire;
(c) utilizing said transmitted movement to bias said jaw bars away from one another and to stretch said second shape memory alloy wire;
(d) terminating heating of said first shape memory alloy wire;
(e) heating said second shape memory alloy wire to cause said second shape memory alloy wire to contract;
(f) transmitting movement caused by said contraction to said jaw bars and said first shape memory alloy wire; and
(g) utilizing said transmitted movement to bias said jaw bars toward one another and to stretch said first shape memory alloy wire.

* * * * *